(12) United States Patent
Roach et al.

(10) Patent No.: US 9,174,738 B1
(45) Date of Patent: Nov. 3, 2015

(54) DRAG DISK, SMALL

(71) Applicant: Google Inc., Mountain View, CA (US)

(72) Inventors: Kevin Roach, San Jose, CA (US); Richard Wayne DeVaul, Mountain View, CA (US); Phillip Clarin, Redwood City, CA (US)

(73) Assignee: Google Inc., Mountain View, CA (US)

( * ) Notice: Subject to any disclaimer, the term of this patent is extended or adjusted under 35 U.S.C. 154(b) by 263 days.

(21) Appl. No.: 13/862,434

(22) Filed: Apr. 14, 2013

(51) Int. Cl.
*B64D 19/00* (2006.01)
*B64B 1/40* (2006.01)
*B64D 1/12* (2006.01)

(52) U.S. Cl.
CPC . *B64D 19/00* (2013.01); *B64B 1/40* (2013.01); *B64D 1/12* (2013.01)

(58) Field of Classification Search
CPC .............. B64B 1/46; B64B 1/48; B64B 1/40; B64D 19/00; B64D 1/12; B64D 1/02; B64D 1/08; A63H 27/10; A63H 33/18
USPC ................................ 244/138 R, 32, 142, 139
See application file for complete search history.

(56) References Cited

U.S. PATENT DOCUMENTS

| | | | | |
|---|---|---|---|---|
| 975,281 | A | * | 11/1910 | Rechtenwald ............ 244/138 R |
| 1,390,745 | A | | 9/1921 | Armstrong |
| 2,365,778 | A | * | 12/1944 | Schwab ........................ 89/1.11 |
| 2,524,277 | A | * | 10/1950 | Stewart ........................ 244/149 |
| 2,790,479 | A | | 4/1957 | Mastenbrook |
| 2,931,597 | A | | 4/1960 | Moore, Jr. |
| 3,047,259 | A | | 7/1962 | Tatnall et al. |
| 3,061,248 | A | * | 10/1962 | Jones et al. ............... 244/138 R |
| 3,098,630 | A | * | 7/1963 | Connors ....................... 244/113 |
| 3,119,578 | A | | 1/1964 | Borgeson et al. |
| 3,386,692 | A | * | 6/1968 | Schuerch .................. 244/138 R |
| 3,390,853 | A | | 7/1968 | Wykes |
| 3,433,435 | A | | 3/1969 | Alai |
| 3,452,949 | A | | 7/1969 | Maloney et al. |
| 3,514,058 | A | * | 5/1970 | Sloan, Jr. et al. ......... 244/138 R |
| 3,614,031 | A | | 10/1971 | Demboski |

(Continued)

FOREIGN PATENT DOCUMENTS

GB 2366548 3/2002
WO 2011/160172 12/2011

(Continued)

OTHER PUBLICATIONS

Wikipedia, Polyamide web page, http://en.wikipedia.org/wiki/Polyamide, accessed Feb. 21, 2015.*

(Continued)

*Primary Examiner* — Tien Dinh
*Assistant Examiner* — Alexander V Giczy
(74) *Attorney, Agent, or Firm* — McDonnell Boehnen Hulbert & Berghoff LLP

(57) ABSTRACT

A payload drag structure having a drag disk comprised of a lightweight, flexible material, a tubular section positioned around a periphery of the drag disk, a flexible member positioned within the tubular section, a cross member having a plurality of aims attached about the periphery of the drag disk, wherein one or more arms of the cross member are adapted for attachment to a payload harness, wherein the payload harness is adapted for attachment to arms of the cross member, and wherein a payload may be secured within the payload harness.

35 Claims, 8 Drawing Sheets

(56) References Cited

U.S. PATENT DOCUMENTS

| | | | |
|---|---|---|---|
| 3,807,384 A | | 4/1974 | Schach et al. |
| 4,113,206 A | | 9/1978 | Wheeler |
| 4,174,082 A | | 11/1979 | Eshoo |
| 4,215,834 A | | 8/1980 | Dunlap |
| 4,262,864 A | | 4/1981 | Eshoo |
| 4,366,936 A | | 1/1983 | Ferguson |
| 4,390,149 A | * | 6/1983 | Barnes et al. .............. 244/31 |
| 4,651,956 A | | 3/1987 | Winker et al. |
| 4,860,660 A | * | 8/1989 | Synofzik et al. .......... 102/501 |
| 4,975,890 A | | 12/1990 | Wolf et al. |
| 5,108,046 A | * | 4/1992 | Chaumette et al. ....... 244/110 D |
| 5,593,113 A | | 1/1997 | Cox |
| 5,645,248 A | | 7/1997 | Campbell |
| 5,967,459 A | * | 10/1999 | Hayashi ..................... 244/32 |
| 6,119,979 A | | 9/2000 | Lee et al. |
| 6,324,398 B1 | | 11/2001 | Lanzerotti et al. |
| 6,540,178 B1 | | 4/2003 | Hillsdon |
| 6,607,166 B1 | | 8/2003 | Pichkhadze et al. |
| 6,628,941 B2 | | 9/2003 | Knoblach et al. |
| 6,648,272 B1 | | 11/2003 | Kothmann |
| 6,808,144 B1 | | 10/2004 | Nicolai et al. |
| 6,830,222 B1 | | 12/2004 | Nock et al. |
| 7,046,934 B2 | | 5/2006 | Badesha et al. |
| 7,203,491 B2 | * | 4/2007 | Knoblach et al. .......... 455/431 |
| 7,261,258 B1 | * | 8/2007 | Fox, Jr. .................... 244/145 |
| 7,341,223 B2 | | 3/2008 | Chu |
| 7,341,224 B1 | | 3/2008 | Osann, Jr. |
| 7,347,147 B2 | * | 3/2008 | Bar et al. .................. 102/473 |
| 7,356,390 B2 | | 4/2008 | Knoblach et al. |
| 7,567,779 B2 | | 7/2009 | Seligsohn et al. |
| 7,568,656 B2 | | 8/2009 | Handley |
| 7,913,948 B2 | | 3/2011 | Porter |
| 7,948,426 B2 | | 5/2011 | Pevler et al. |
| 8,061,648 B2 | | 11/2011 | Lachenmeier |
| 8,167,236 B2 | | 5/2012 | Jess |
| 8,356,569 B2 | | 1/2013 | Sjoblom |
| 8,812,176 B1 | * | 8/2014 | Biffle et al. .................. 701/2 |
| 2002/0139032 A1 | * | 10/2002 | Campbell ..................... 43/11 |
| 2004/0065773 A1 | | 4/2004 | Morales |
| 2004/0163216 A1 | * | 8/2004 | Simonson et al. ......... 24/68 CD |
| 2006/0000945 A1 | | 1/2006 | Voss |
| 2008/0272233 A1 | | 11/2008 | Marlin |
| 2009/0026319 A1 | * | 1/2009 | Strong ........................ 244/152 |
| 2009/0294576 A1 | | 12/2009 | LaForge |
| 2010/0039984 A1 | | 2/2010 | Brownrigg |
| 2012/0031119 A1 | | 2/2012 | Ahmad et al. |
| 2012/0081908 A1 | | 4/2012 | Harms et al. |

FOREIGN PATENT DOCUMENTS

| | | |
|---|---|---|
| WO | 2012/012275 | 1/2012 |
| WO | 2012/025769 | 3/2012 |

OTHER PUBLICATIONS

Horwath et al., "Broadband Backhaul Communication for Stratospheric Platforms: The Stratospheric Optical Payload Experiment (STROPEX)," Society of Photo-Optical Instrumentation Engineers (SPIE), 2006, vol. 6304 (12 pages).
Giggenbach et al., "Optical Free-Space Communications Downlinks from Stratospheric Platforms—Overview on Stropex, the Optical Communications Experiment of CAPANINA," 14th IST Mobile & Wireless Communications Summit, Jun. 2005, No. 483, Dresden, Germany (4 pages).
Acampora et al., "A Broadband Wireless Access Network Based on Mesh-Connected Free-Space Optical Links," IEEE Personal Communications, Oct. 1999, 1070-9916/99, pp. 62-65.
Thornton et al., "Broadband communications from a high-altitude platform: the European HeliNet programme," Electronics & Communication Engineering Journal, Jun. 2001, pp. 138-144.
Akella et al., "Building Blocks for Mobile Free-Space-Optical Networks," IEEE, 2005, 0-7803-9019-9/05 (5 pages).
Grace, D. et al., "CAPANINA—Communications from Aerial Platform Networks Delivering Broadband Information for All," 14th IST Mobile & Wireless Communications Summit, Jun. 2005, No. 252, Dresden, Germany (5 pages).
Mohorcic et al., "Evaluation of Wavelength Requirements for Stratospheric Optical Transport Networks," Journal of Communications, Sep. 2009, vol. 4, No. 8, pp. 588-596.
Fortuna et al., "HAP based optical transport network design," Proceedings of the 15th International Electrotechnical and Computer Science Conference (ERK) Sep. 2006 (4 pages).
Aragon-Zavala et al., High-Altitude Platforms for Wireless Communications, John Wiley & Sons, Ltd., 2008, pp. C1-C80.
Aragon-Zavala et al., High-Altitude Platforms for Wireless Communications, John Wiley & Sons, Ltd., 2008, pp. 81-158.
Aragon-Zavala et al., High-Altitude Platforms for Wireless Communications, John Wiley & Sons, Ltd., 2008, pp. 159-241.
Biswas, A. et al., "Deep Space Optical Communications Link Availability and Data Volume," Free-Space Laser Communication Technologies XVI, San Jose, CA, Jan. 2004 (9 pages).
Giggenbach et al., "Optical Data Downlinks from Earth Observation Platforms," Proceedings of the SPIE, 2009, vol. 7199 (14 pages).
Grace et al., "Integrating Users into the Wider Broadband Network via High Altitude Platforms," IEEE Wireless Communications, 1536-1286/05, Oct. 2005, pp. 98-105.
Akella et al., "Multi-channel Communication in Free-Space Optical Networks for the Last-mile," available online at: http://networks.ecse.rpi.edu/~sri/papers/Array-lanman07.pdf (last visited Jan. 18, 2012).
Willner et al., "Physical Layer Routing in Free-Space Optical Networks, LEOS," available online at: http://photonicssociety.org/newsletters/oct05/physical_layer.html (last visited Jan. 18, 2012).
Mullins, Justin "NASA Develops 'Smart' Weather Balloons for Launch Sites," NewScientist, May 23, 2007.
Hutchinson, James, Mobile Mesh Network Finds Interest in NGOs, Australian Red Cross enthusiastic about options presented by mesh telephony, available online at: http://www.computerworld.com.au/article/374682/mobile_mesh_network_finds_interest_ngos/ (last visited Jan. 17, 2012).
Dung Dinh Luong, et al., Network Architecture and Protocols, CAPANINA, Oct. 16, 2006, pp. 1-83.
Dung Dinh Luong, et al., Network Architecture and Protocols, CAPANINA, Oct. 16, 2006, pp. 84-172.
In Keun Son, Design and Optimization of Free Space Optical Networks, Auburn University, Dec. 13, 2010, pp. 1-78, Auburn, Alabama.
In Keun Son, Design and Optimization of Free Space Optical Networks, Auburn University, Dec. 13, 2010, pp. 79-147, Auburn, Alabama.
Hui Zang, et al., A Review of Routing and Wavelength Assignment Approaches for Wavelength-Routed Optical WDM Networks, Optical Networks Magazine, Jan. 2000, pp. 47-60.
Bloom, et al., "The Last-Mile Solution: Hybrid FSO Radio," AirFiber, Inc., May 2002, pp. 1-20.
Di Wang, et al., "Throughput Capacity of Hybrid Radio-Frequency and Free-Space-Optical (RF/FSO) Multi-Hop Networks," Department of Electrical, Computer and Systems Engineering, Rensselaer Polytechnic Institute, pp. 1-8.
Smadi, et al., "Free-Space Optical Gateway Placement in Hybrid Wireless Mesh Networks," Journal of Lightwave Technology, Jul. 15, 2009, vol. 27, No. 14, pp. 2688-2697.
Eddleston, et al., Mesh Networking Soars to New Heights, available online at: http://www.airballooningevent.com/mesh-networking-soars-to-new-heights (last visited Jan. 18, 2012) (Feb. 19, 2005).
Walsh, Balloon Network Test Successful, available online at: http://17.taylor.edu/community/news/news_detail.shtml?inode=14221 (last visited Jan. 18, 2012) Nov. 5, 2007.
Tozer et al., High-altitude platforms for wireless communications, Electronics & Communication Engineering Journal, Jun. 2001, 127-137.

(56) References Cited

OTHER PUBLICATIONS

Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012), pp. 1-19.

Ozdaglar, et al., Routing and Wavelength Assignment in Optical Networks, available online at: http://web.mit.edu/asuman/www/documents/RWA_Paper.pdf (last visited Jan. 18, 2012), pp. 1-25.

Grace et al., Broadband Communications via High Altitude Platforms, John Wiley & Sons, Ltd., 2011, pp. 49-73.

Grace et al., Broadband Communications via High Altitude Platforms, John Wiley & Sons, Ltd., 2011, pp. 75-113.

Grace et al., Broadband Communications via High Altitude Platforms, John Wiley & Sons, Ltd., 2011, pp. 219-238.

Balaram et al., "Autonomous Mobility, Navigation and Control for Venus Aerobots," International Symposium on Artificial Intelligence, Optics and Automation in Space, Jul. 14, 1997, Tokyo, Japan, pp. 1-7.

Carten Jr., Andrew S., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts, pp. 1-62.

Corbett et al., High Altitude Balloon Project, Wright State University, Engineering Design, Mar. 11, 2006, Dayton, Ohio, pp. 1-76.

International Search Report for PCT/US2013/020525 mailed Apr. 22, 2013, 16 pages.

Biffle et al., U.S. Appl. No. 13/731,979, filed Dec. 31, 2012, 52 pages.

Notice of Allowance for U.S. Appl. No. 13/731,979, filed Apr. 9, 2015, 7 pages.

* cited by examiner

DRAG DISK, SMALL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a payload drag structure is provided having a drag disk comprised of a lightweight, flexible material a tubular section positioned around a periphery of the drag disk, a flexible member positioned within the tubular section, a cross member having a plurality of arms attached about the periphery of the drag disk, wherein one or more of the arms of the cross member are adapted for attachment to a payload harness, wherein the payload harness is adapted for attachment to arms of the cross member, and wherein a payload may be secured within the payload harness.

In another aspect, a balloon is provided having a balloon envelope, a payload drag structure positioned beneath the balloon envelope, the payload drag structure comprising a drag disk comprised of a lightweight, flexible material, a tubular section positioned around a periphery of the drag disk, a flexible member positioned within the tubular section, a cross member having a plurality of arms attached about the periphery of the drag disk, a payload harness extending below the drag disk, wherein a payload may be secured within the payload harness, a control system configured to initiate a process to cause the balloon envelope to no longer provide lift to the payload; and wherein the payload drag structure serves to slow the descent of the payload to the earth.

In a further aspect, a balloon is provided having a balloon envelope and a payload secured to the balloon envelope, and means for slowing the descent of the payload to the surface of the earth after the payload is separated from the balloon envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
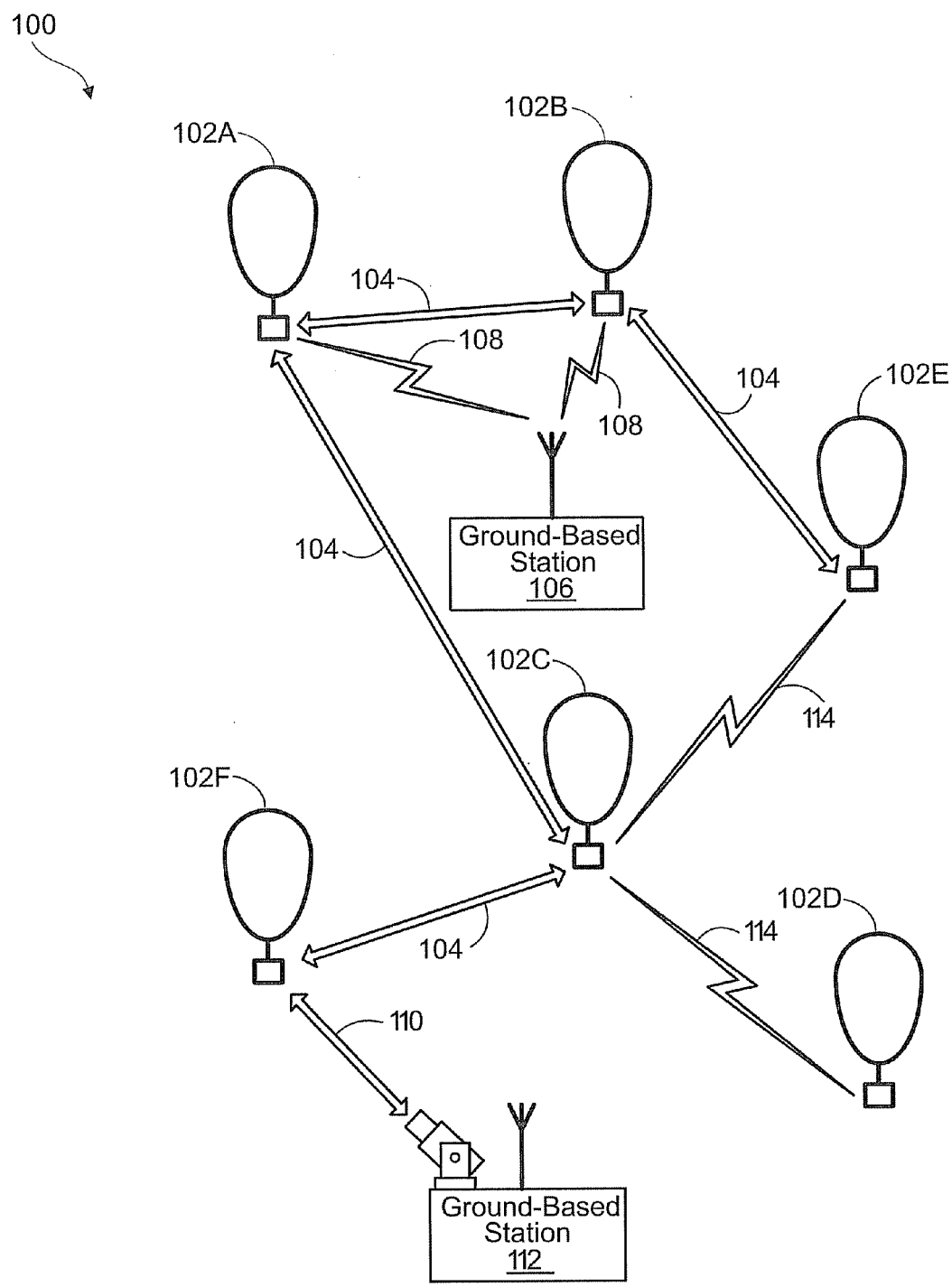
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, such balloons may include an envelope, a payload, and a cut-down system that is attached between the balloon and payload, along with various other components.

Instruments and electronic equipment may be positioned within a payload that may be used for communication, or to record various data and information. After a period of time, it may be desirable to have the payload return to the surface of the earth to retrieve and/or replace the instruments and electronic devices positioned in the payload. There may also be other, perhaps more important, reasons to bring the payload down to the earth's surface. For example, the balloon payload may be brought down to provide necessary upgrades to the electronic equipment within the payload. Or, the payload may be brought down to prevent the payload from entering into unauthorized air space. Other reasons are also possible.

The balloon envelope may be deflated or collapsed, or disconnected from the payload, to allow the payload to descend to the surface of the earth. For example, the balloon envelope may be caused to rip, opening a hole in the envelope to deflate the balloon; or if a cord is used to attach the payload to the balloon envelope, the cord may be severed, using for example mechanical, electromagnetic, or thermal devices. Once the balloon is deflated, or the payload is severed from the balloon envelope, the payload is allowed to descend to the earth.

When a payload is descending to the ground, it may be desirable to slow the rate of descent so that the instruments or electronic devices are not damaged upon impact, so that the data and information that has been obtained and stored in the payload may be retrieved, and/or to reduce the risk of injury to people or property beneath payload. A parachute could be deployed from the payload to slow the rate of descent, although the remote deployment of a parachute may be unreliable. If the parachute fails to deploy, an undesirable, uncontrolled descent of the payload may occur.

Example embodiments may be directed to a payload drag structure that may be used with a balloon envelope. The payload drag structure may include a payload harness attached to a drag disk that may be used to secure the payload to the drag disk. The drag disk may serve to slow the descent of the payload after the balloon envelope has been deflated or disconnected from the payload. The drag disk has a surface area that creates a drag force as the payload descends towards the earth. The larger the surface of the drag disk, the larger the drag forces that are created slowing the descent of the payload.

An advantage of using a drag disk is that it does not need to be deployed, like a parachute would be, to slow the descent of the payload because the drag disk is already in place. Thus, the use of a drag disk to control the descent of the payload eliminates any issues or risks that may arise when a means for slowing the descent must be deployed, e.g., when using a parachute that must properly deploy.

Ideally, the drag disk may be comprised of a flexible, lightweight material so that it does not require a great deal of added lifting force and does not adversely affect the ability to maintain a desired balloon altitude prior to the final descent of the payload. For the same reasons, the payload harness is also preferably made of lightweight material.

The drag disk may be made of a lightweight flexible material such as ripstop nylon, and may be provided with a silicone overcoat for UV protection. The outer perimeter of the drag disk may include a pocket or tubular section, which could be made of nylon webbing, within which a strong, flexible member, such as a pole of carbon fiber or fiberglass may be positioned. A cross member preferably having a plurality of arms, which may be made of flexible material such as nylon or polypropylene webbing, may be attached at the periphery of the drag disk. One end of each of the arms may be looped around and attached to an aluminum ring at the center of the drag disk, and the other end may be attached around the pocket or tubular section. The arms of the cross member may be sewn into the drag disk.

An upper portion of a payload harness may be attached to the arms of the cross member. The payload harness may also be made of nylon or polypropylene webbing material. A lower portion of the payload harness, which may be removably secured to the upper portion of the payload harness, may be positioned beneath the payload.

As the payload descends, it is secured within the payload harness, which is in turn securely attached to the drag disk. Because the arms of the cross member are attached to the perimeter of the drag disk, the weight of the payload is distributed onto the carbon fiber or fiberglass pole positioned within the tubular member about the perimeter of the drag disk.

There are no rigid members that could cause damage upon landing, and there are no free lines that could get tangled, as might occur with a parachute. Upon landing, the lower portion of the payload harness may be disconnected from the upper portion of the payload harness to allow for removal of the payload from both the payload harness.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
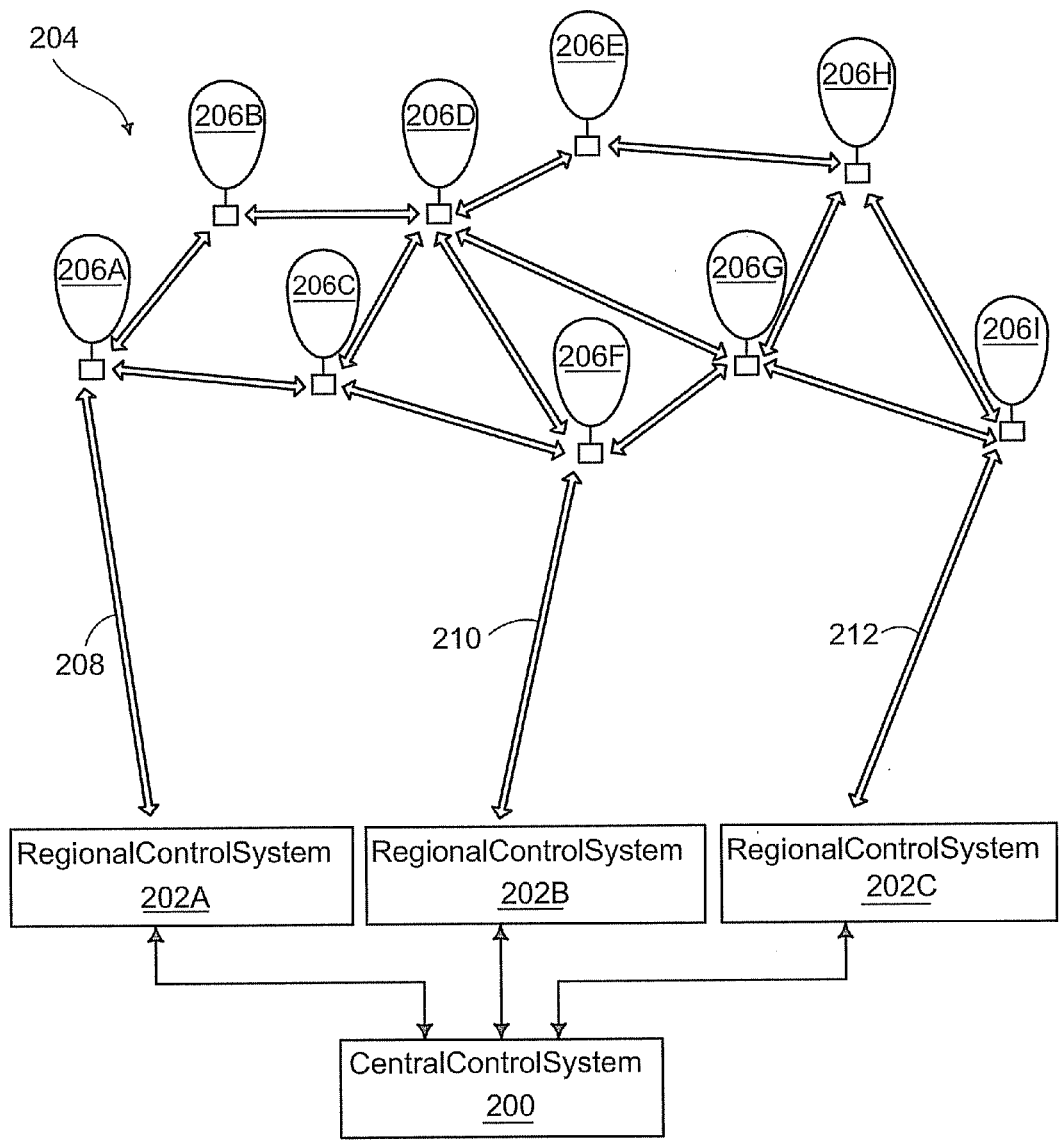
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
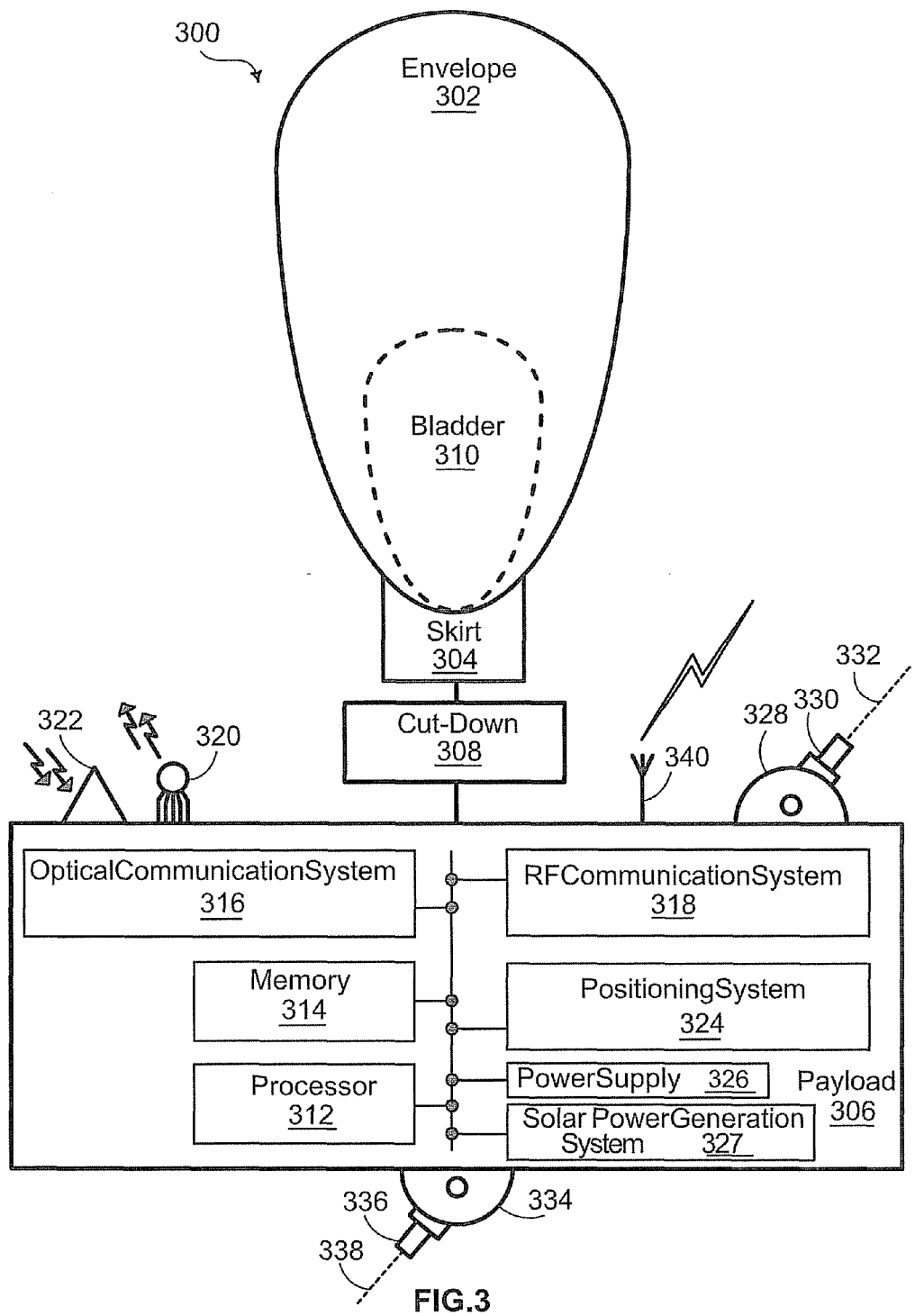
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller or control system of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
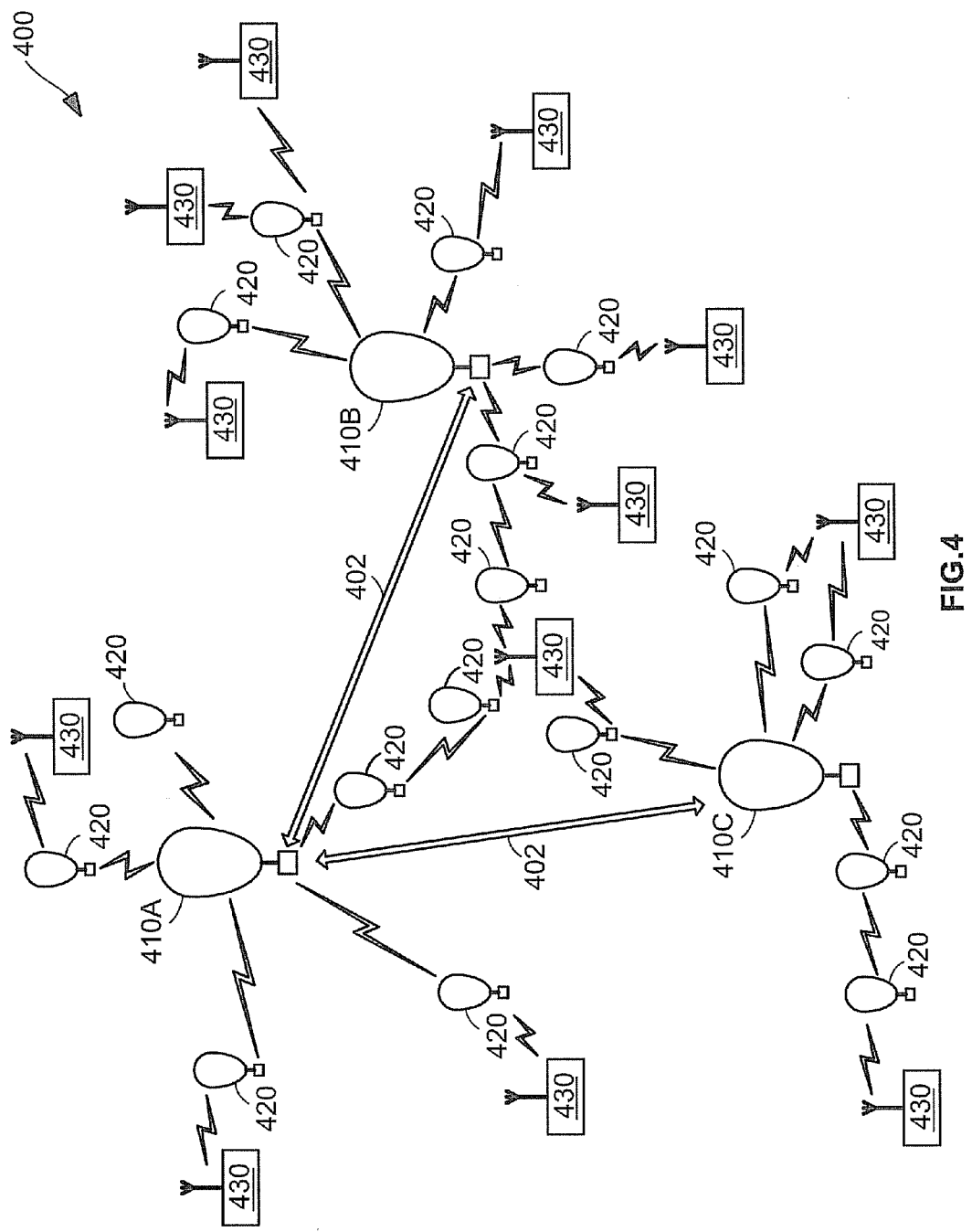
FIG. 4 shows a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Examples of Payload Drag Structures

As noted above, instruments or electronic devices may be positioned within a payload attached to a high atmosphere balloon. After a period of time, it may be desirable to have the payload return to the surface of the earth for a number of reasons, such as to repair or replace equipment, to retrieve the information obtained from the instruments and electronic devices positioned in the payload, or to prevent the balloon from entering unauthorized air space.

The balloon envelope may be deflated or collapsed, or disconnected from the payload, to allow the payload to descend to the surface of the earth. For example, the balloon envelope may be caused to rip, opening a hole in the envelope to deflate the balloon; or if a cord is used to attach the payload to the balloon envelope, the cord may be severed, using for example mechanical, electromechanical, or thermal devices. Once the balloon is deflated, or the payload is separated from the balloon envelope, the payload is allowed to descend to the earth.

It is desirable to slow the rate of descent of the payload to the earth so that the instruments or electronic devices are not damaged upon impact. A parachute could be deployed from the payload to slow the rate of descent, although the remote deployment of a parachute may be unreliable. If the parachute fails to deploy, an undesirable, uncontrolled descent of the payload may occur.

Example embodiments may be directed to a drag plate structure that may be used with a balloon envelope. The payload drag structure may include a payload harness attached to a drag disk that may be used to secure the payload to the drag disk. The drag disk may serve to slow the descent of the payload after the balloon envelope has been deflated or disconnected from the payload. The drag disk has a surface area that creates a drag force as the payload descends towards the earth.

Figure 5:
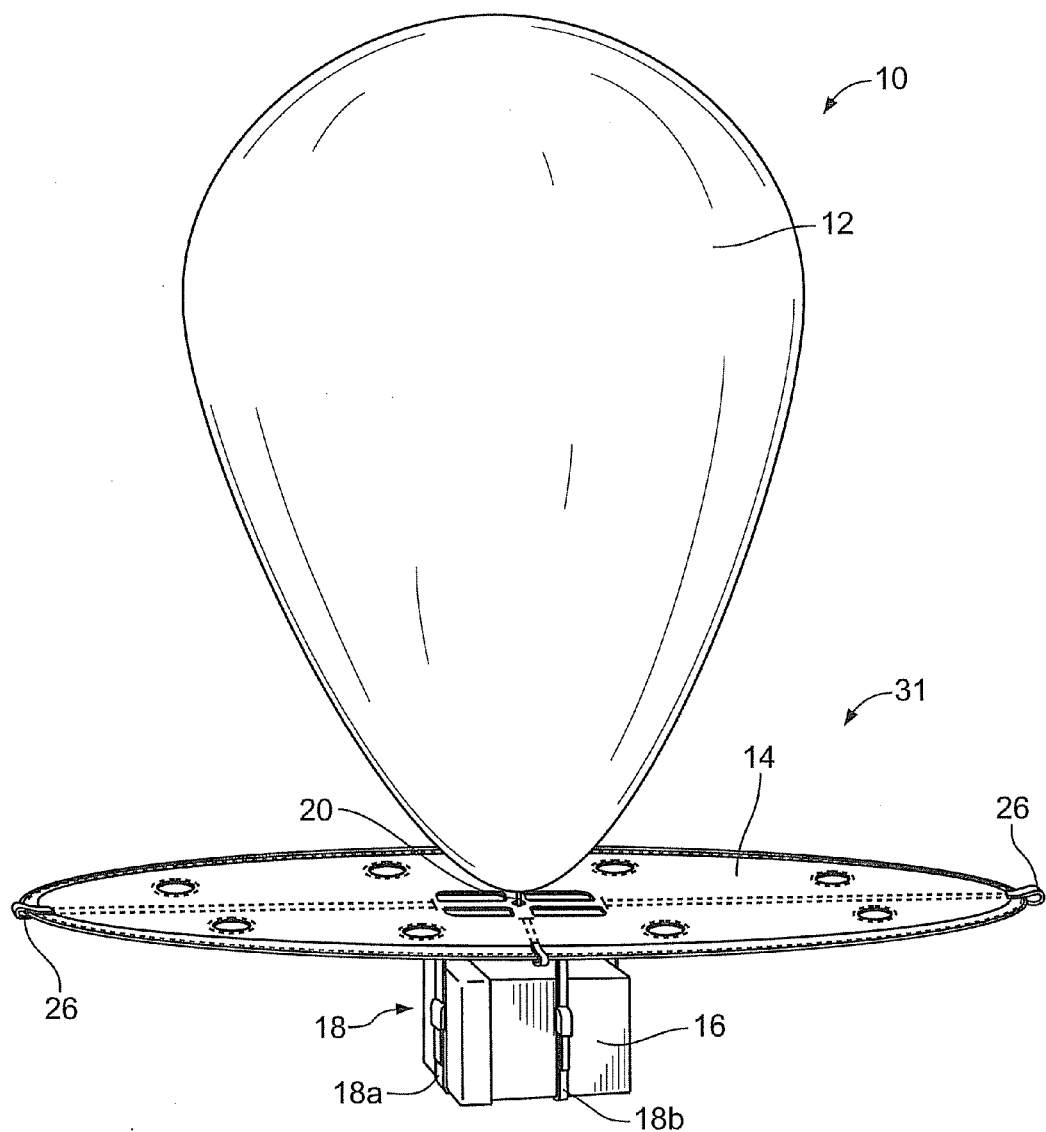
FIG. 5 shows a perspective view of an expanded balloon envelope 12 positioned above payload 16 and drag disk 14, with payload 16 secured within payload harness 18, according to an example embodiment.

As shown in FIG. 5, a payload drag structure 31 is positioned beneath balloon 10. Payload drag structure 31 includes a drag disk 14 that has a payload harness 18 that is used to secure payload 16 to drag disk 14. In FIG. 5, the balloon envelope 12 is attached to payload 16 with line 20 which extends through a hole in the center of drag disk 14. Alternately, the balloon envelope could be attached to drag disk 14. The drag disk 14 described herein is well suited for a payload of 5-10 kilograms, although smaller or larger weight payloads may also be used.

Figure 6A:
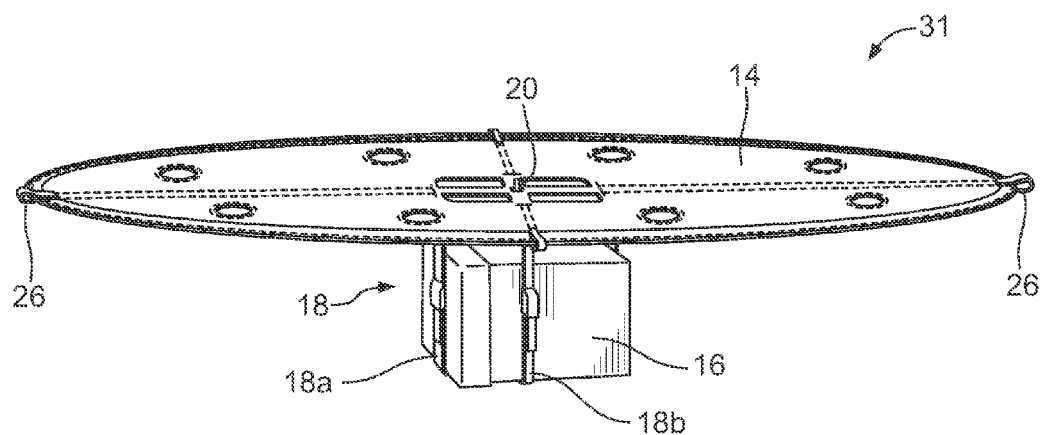
FIG. 6A shows payload 16 secured beneath drag disk 14 in payload harness 18 after the balloon envelope has been separated, according to an example embodiment.
Figure 6B:
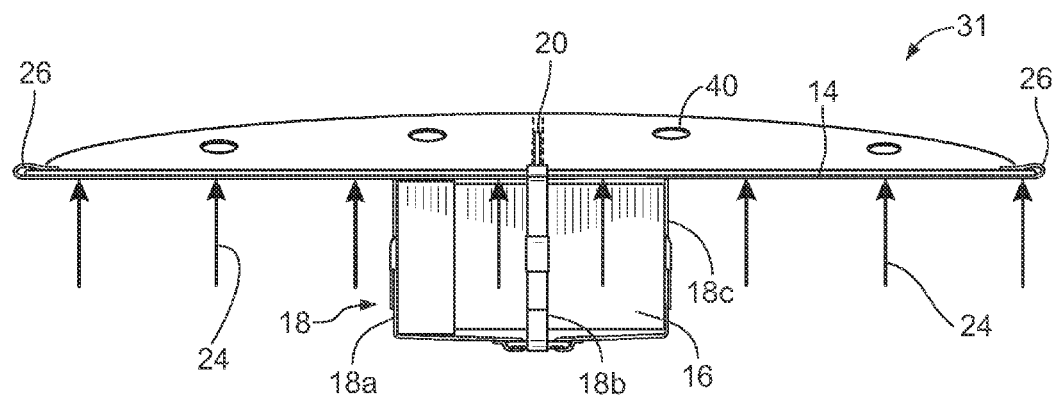
FIG. 6B shows a side view of the payload 16 within payload harness 18 and drag disk 14 shown in FIG. 6A with drag force acting upon the drag disk, according to an example embodiment.

FIG. 6A is a perspective view showing payload drag structure 31 after the balloon envelope 12 has been separated from the payload 16. FIG. 6B is a side view of the payload drag structure 31 shown in FIG. 6A. In this case, line 20 is shown having been severed. Line 20 may be severed using mechanical, electromagnetic, or thermal devices, or other suitable means for severing or disconnecting the balloon envelope 20 from the drag disk 14. In some applications, the deflated balloon envelope may remain attached to the drag disk 14. The drag disk 14 has a surface area that creates a drag force (depicted by the arrows 24) as the payload 16 descends towards the earth and is forced through the air in the atmosphere. The larger the surface of the drag disk 14 facing the earth, the larger the drag forces that are created, thereby slowing the descent of the payload. Similarly, the drag forces increase as the atmosphere becomes thicker as the payload continues its descent towards the surface of the earth.

After the balloon envelope 12 is separated from the drag disk 20, the payload 16 remains secured within payload harness 18 attached to drag disk 14. Payload harness 18 may include a number of straps, such as straps 18a, 18b, and 18c that extend downwardly from drag disk 14 and extend around payload 16.

Drag disk 14 advantageously includes a number of loops 29a-d extending from a periphery of the drag disk 14 that serve as attachment points or mounting locations for cameras, antennas, or other sensors, and solar panels that could be mounted to the drag disk 14. The loops 29a-d may be on the order one half inch in size so that carabineers, rings, and other clips may be readily attached to the loops 29a-d for mounting purposes. The loops 29a-d may be integrally formed with, and be extensions of, the arms 52a, 52b, 52c, and 52d of cross member 50 shown in FIG. 8. The arms 52a, 52b, 52c, and 52d, and loops 29a-d may be formed of a flexible webbing material, such as nylon or polypropylene webbing material. Alternately, instead of a loop made of the webbing material, a metal ring could be secured to the end of the arm, or to the drag disk itself, to provide a suitable attachment point.

Ideally, the drag disk 14 may be comprised of a flexible, lightweight material so that it does not require a great deal of added lifting force and does not adversely affect the ability to maintain a desired balloon altitude prior to the final descent of the payload. As an example, the drag disk 14 may be made of ripstop nylon which is a strong, flexible, and lightweight material suitable for withstanding the forces that will be experienced during the descent of the payload.

For the same reasons, the payload harness 18 is also preferably made of lightweight material. As an example, the payload harness 18 may be made of nylon or polypropylene webbing that may have a width of a half inch, which is suitable for securing a 5-10 kilogram payload 16 to the drag disk 14.

Figure 7:
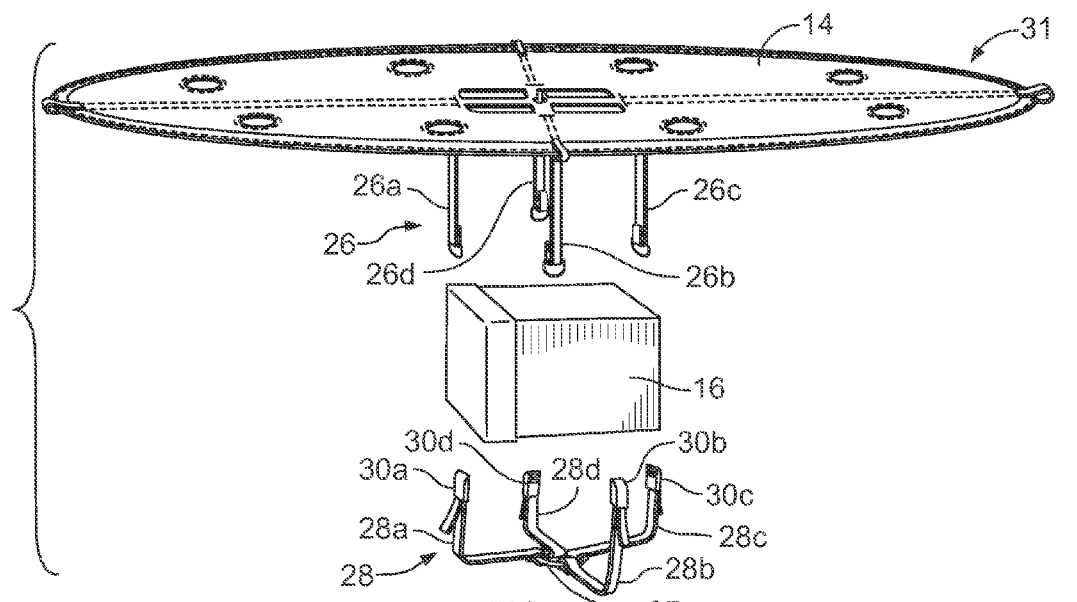
FIG. 7 shows a perspective view of the payload 16 and drag disk 14 shown in FIG. 6A with the lower portion 28 of the payload harness separated from the upper portion 26 of the payload harness, according to an example embodiment.

As shown in FIG. 7, the payload harness may include an upper portion 26 and a lower portion 28. Upper portion 26 of the payload harness may include four downwardly extending straps 26a, 26b, 26c, and 26d that may be made of the nylon or polypropylene webbing that may have a width of a half inch. Additional straps could also be used. Lower portion 18 of the payload harness may also include four straps, such as straps 28a, 28b, 28c, and 28d that may be made of nylon or polypropylene webbing that may have a width of a half inch. Straps 28a, 28b, 28c, and 28d are shown each attached to a central ring 37 (which could also be a square member) positioned beneath the center of the drag disk 14. Additional straps for the lower portion 28 of the payload harness could also be used. It will be appreciated that the straps used for the upper portion 26 and lower portion 28 of the payload harness could also be made of other materials suitable for securing payload 16 to drag disk 14 having varying widths.

Straps 28a, 28b, 28c, and 28d are shown each attached to a central ring positioned beneath the center of the drag disk 14. Additional straps for the lower portion 28 of the payload harness could also be used. It will be appreciated that the straps used for the upper portion 26 and lower portion 28 of the payload harness could also be made of other materials suitable for securing payload 16 to drag disk 14 having varying widths.

The straps 26a, 26b, 26c, and 26d of upper portion 26 of the payload harness may be attached to the straps 28a, 28b, 28c, and 28d of lower portion 28 of the payload harness using carabiners, D-rings, cam buckles, or other suitable fasteners. As shown in FIG. 7, cam buckles 30a, 30b, 30c, and 30d are used to attach the straps of the upper portion 26 of the payload harness to the lower portion 18 of the payload harness, as they allow the straps to be cinched tightly down onto the payload 16 to securely the position payload 16 against drag disk 14.

It will be appreciated that the straps of the upper and lower portions 26 and 28 of the payload harness are formed as one integral strap. For example, in some embodiments it is possible that straps 26b and 28b are an integral strap without a buckle or securing device between them, that straps 26c and 28c are an integral strap without a buckle or securing device between them, and that straps 26d and 28d are an integral strap without a buckle or securing device between them, where each of the integral straps are sized to tightly hold the payload 16 therein. In such an embodiment, the payload could be inserted into the payload harness and straps 26a and 28a could then be attached with cam buckle 30a (or other securing device), and straps 26a and 28a could be cinched together to secure the payload 16 within the payload harness.

Figure 8:
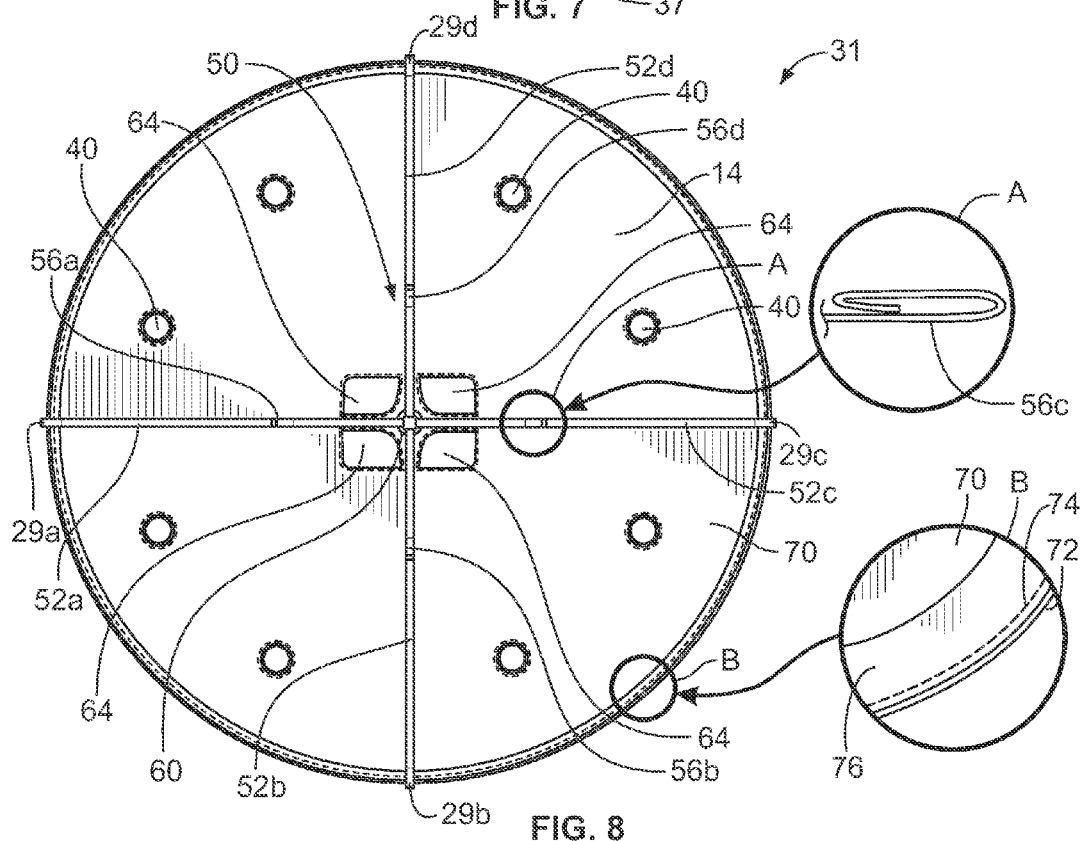
FIG. 8 is a bottom view of the drag disk 14 shown in FIGS. 5-7, with close up views of portions of the drag disk 14, according to an example embodiment.

The drag disk 14 preferably includes a silicone overcoat for UV protection. A bottom view of the payload drag structure 31 is shown in FIG. 8. As shown in FIG. 8, the outer perimeter of the drag disk 14 may include a pocket or tubular section 76, which could be made of nylon webbing sewn into the drag disk 14. For example, two pieces of nylon webbing could be sewn together and into the drag disk 14, leaving a pocket or tubular section 76 between the two pieces of nylon webbing, within which a strong, flexible member, such as a pole of carbon fiber or fiberglass may be positioned. As shown in circular section B in FIG. 8, stitching 74 may be used to form the pocket or tubular section 76 by sewing and securing the nylon webbing to the ripstop nylon 70. The pocket or tubular section 76 is shown at the periphery of drag disk 14 near the outer perimeter 72. As used herein the term "periphery" shall be broadly construed and means near, several inches or so from, the outer perimeter 72. The pocket or tubular section 74 could also be comprised of a flexible plastic tube that may be sewn into, or attached to, the drag disk 14.

The pole may be made of carbon fiber or fiberglass, or even wood, and is preferably strong, flexible, and lightweight. The pole may have a variety of cross sections, such as rectangular, square, oval, or circular, as examples, and may be solid or tubular. The cross section of the pole may preferably have a rectangular shape on the order of 1 inch tall with a ⅛ inch to ¼ inch width, which has sufficient strength for securing a 5-10 kilogram payload to the drag disk 14 during descent. The pole should maintain some spring forces for impact and be relatively stable.

A cross member 50 preferably having a plurality of arms such as arms 52a, 52b, 52c, and 52d, which may be made of flexible material such as nylon or polypropylene webbing, may be attached to the drag disk 14. One end of each of the arms may be looped around and attached to an aluminum ring 60 at or near the center of the drag disk 14, and the other end may be attached around pocket or tubular section 76. The arms of the cross member 50 may preferably be sewn into the drag disk 14. Because the arms 52a, 52b, 52c, and 52d of the cross member 50 are attached to the periphery of the drag disk 14, the weight of the payload 16 is distributed onto the carbon fiber or fiberglass pole positioned within the pocket or tubular section 76 at the periphery of the drag disk 14.

The arms 52a, 52b, 52c, and 52d of cross member 50 may include an attachment portion 56a, 56b, 56c, and 56d that may be used for attaching the straps 26a, 26b, 26c, and 26d of the upper portion 26 of the payload harness to the arm. As shown in circular close up A, the attachment portion may take the form of a loop 56c of nylon or propylene webbing. In addition, it is also possible that the straps 26a, 26b, 26c, and 26d of the upper portion 26 of the payload harness are integrally formed with the arms 52a, 52b, 52c, and 52d. In addition, four arms are shown in cross member 50 that are spaced equidistantly from each other. Additional arms may also be used and in certain applications equal spacing between the arms is not required.

Figure 9:
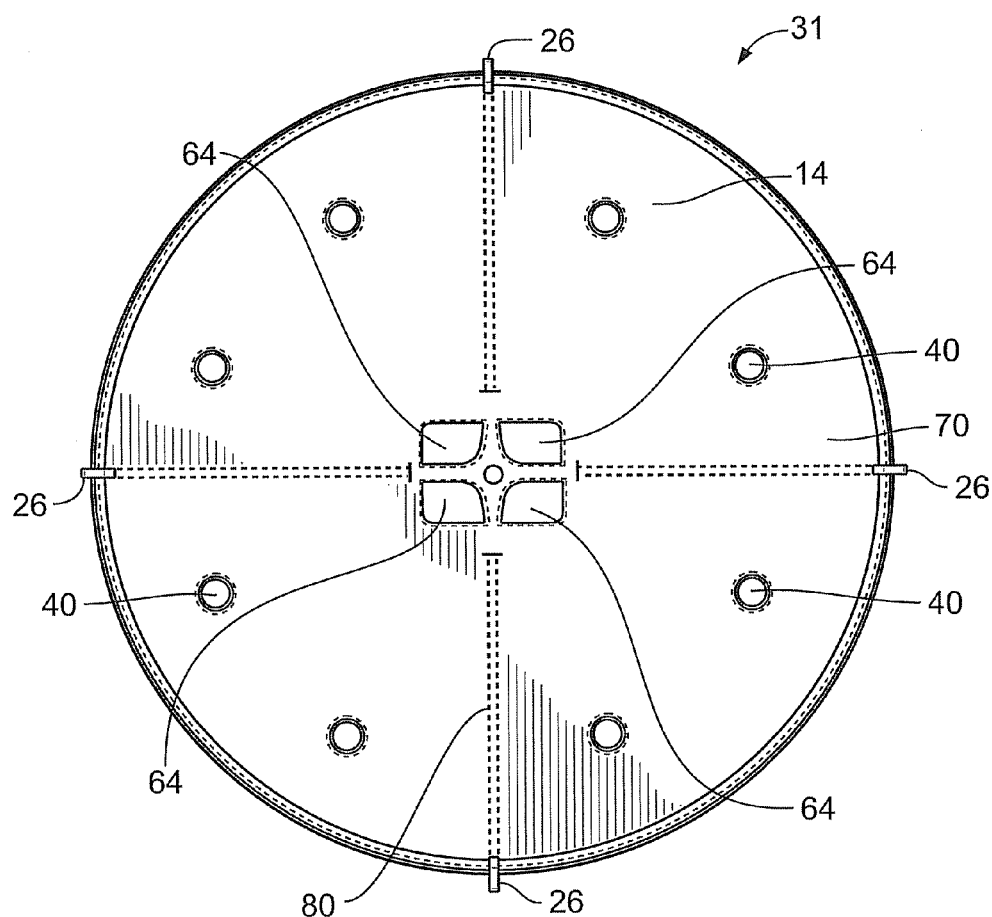
FIG. 9 shows a top view of the drag disk 14 shown in FIGS. 5-8, according to an example embodiment.

The drag disk 14 shown in FIGS. 5-9 also includes a number of holes 40 that serve to improve turbulence during descent and improve the drag coefficient of the drag disk 14. The holes 40 may be circular having a diameter of three inches. In FIGS. 8 and 9 they are shown generally spaced apart at equal intervals and are located about halfway between the outer perimeter 72 of the drag disk 14 and the center of the drag disk 14. In some embodiments, a fewer or greater number of holes 40 may be used. For example, in some embodiments, the diameter of the drag disk 14 may be from 32 to 64 inches. In the 32 inch diameter design, only 4 holes may be used, whereas in the 64 inch diameter design, 8 holes may be used. The holes 40 are shown as circular holes which is preferred, although the holes could take the form of other shapes if desired, such as polygonal, square, rectangular, etc. In addition, while a 3 inch diameter hole is preferred, the holes could be larger or smaller as desired.

In addition, as shown in FIGS. 8 and 9, the drag disk 14 may include additional holes 64 near the center of the drag disk 14 that allow for wiring or components to pass through the drag disk 14 from equipment within the payload to peripheral devices that may be mounted to the drag disk 14 using loops 29a-d, for example.

In the described embodiments, there are no rigid members that could cause damage upon landing, and there are no free lines that could get tangled, as might occur with a parachute. Upon landing, the lower portion 28 of the payload harness may be disconnected from the upper portion 26 of the payload harness to allow for removal of the payload 16 from the payload harness 18.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A payload drag structure comprising:
   a drag disk comprised of a flexible material;
   a tubular section positioned around a periphery of the drag disk;
   a flexible member positioned within the tubular section;
   a payload harness positioned beneath the drag disk;
   a cross member having a plurality of arms attached about the periphery of the drag disk and extending inwardly in a single plane, wherein one or more of the arms of the cross member are adapted for attachment to the payload harness;
   wherein the payload harness is adapted for attachment to arms of the cross member and is capable of securing a payload.

2. The payload drag structure of claim 1, wherein the cross member has four arms connected to a centrally positioned member of the drag disk.

3. The payload drag structure of claim 2, wherein the four arms of the cross member are attached at equidistant points about the periphery of the drag disk.

4. The payload drag structure of claim 1, wherein the arms of the cross member are attached to a ring that is located at or near a center of the drag disk.

5. The payload drag structure of claim 1, wherein the arms of the cross member are comprised of a flexible webbing material.

6. The payload drag structure of claim 1, wherein the arms of the cross member are sewn into the drag disk.

7. The payload drag structure of claim 1, wherein one or more arms of the cross member have an end with a loop to provide an attachment point on the drag disk.

8. The payload drag structure of claim 1, wherein a plurality of holes are positioned in the drag disk.

9. The payload drag structure of claim 8, wherein the plurality of holes are circular holes having a diameter of three inches.

10. The payload drag structure of claim 8, wherein there are eight circular holes in the drag disk.

11. The payload drag structure of claim 1, wherein the drag disk is comprised of ripstop nylon.

12. The payload drag structure of claim 5, wherein the arms of the cross member are comprised of nylon webbing material.

13. The payload drag structure of claim 8, wherein at least one of the plurality of holes is located near the center of the drag disk to allow for wiring to extend through the drag disk.

14. The payload drag structure of claim 1, wherein the flexible member is comprised of carbon fiber or fiberglass.

15. The payload drag structure of claim 14, wherein the flexible member has a height of about 1 inch and a width from about ⅛ inch to about ¼ inch.

16. The payload drag structure of claim 1, wherein the tubular section extends continuously around the periphery of the drag disk.

17. The payload drag structure of claim 1, wherein an upper portion of the payload harness has four downwardly extending members beneath the drag disk.

18. The payload drag structure of claim 1, wherein an upper portion of the payload harness is attached to the arms of the cross member.

19. The payload drag structure of claim 1, wherein an upper portion of the payload harness is comprised of nylon webbing.

20. The payload drag structure of claim 1, wherein the drag disk has a diameter of about 32 inches to about 64 inches.

21. The payload drag structure of claim 1, wherein an upper portion of the payload harness is attached directly to the one or more arms of the cross member.

22. The payload drag structure of claim 1, wherein a lower portion of the payload harness is attached to an upper portion of the payload harness, and the payload is secured between the upper portion of the payload harness and the lower portion of the payload harness.

23. The payload drag structure of claim 19, wherein the upper portion of the payload harness is integrally formed with the arms of the cross member.

24. The payload drag structure of claim 1, wherein an upper portion of the payload harness is attached to a lower portion of the payload harness using cam buckles.

25. The payload drag structure of claim 1, wherein a lower portion of the payload harness is comprised of a plurality of members that are each attached to a ring or square member positioned beneath the drag disk.

26. A balloon, comprising:
   a balloon envelope;
   a payload drag structure positioned beneath the balloon envelope, the payload drag structure comprising:
   a drag disk comprised of a lightweight, flexible material;
   a tubular section positioned around a periphery of the drag disk;
   a flexible member positioned within the tubular section;
   a cross member having a plurality of arms attached about the periphery of the drag disk and extending inwardly in a single plane;
   a payload harness extending below the drag disk;
   wherein the payload harness is adapted to secure a payload;
   a control system configured to initiate a process to cause the balloon envelope to no longer provide lift to the payload; and
   wherein the payload drag structure serves to slow the descent of the payload to the earth.

27. The balloon of claim 26, wherein the balloon envelope is attached to the drag disk or the payload.

28. The balloon of claim 26, wherein the plurality of arms of the cross member are sewn into the drag disk.

29. The balloon of claim 26, wherein a plurality of holes are positioned in the drag disk.

30. The balloon of claim 26, wherein the drag disk is made of ripstop nylon and at least some of the plurality of arms are comprised of a flexible webbing material.

31. The balloon of claim 26, wherein the flexible member is comprised of carbon fiber or fiberglass.

32. The balloon of claim 31, wherein the flexible member has a height of about 1 inch and a width from about ⅛ inch to about ¼ inch.

33. The balloon of claim 26, wherein the tubular section extends continuously around the periphery of the drag disk.

34. The balloon of claim 26, wherein the payload harness is comprised of an upper portion that is attached to a lower portion.

35. The balloon of claim 26, wherein the payload harness is comprised of a flexible webbing material.

* * * * *